United States Patent [19]

Roques et al.

[11] 4,148,728

[45] Apr. 10, 1979

[54] SCALE-INHIBITING COMPOSITIONS FOR AQUEOUS SOLUTIONS

[75] Inventors: Henri Roques, Portet sur Garonne; André Girou, Lanta, both of France

[73] Assignee: Produits Chimiques Ugine Kuhlmann, Paris, France

[21] Appl. No.: 743,619

[22] Filed: Nov. 22, 1976

[30] Foreign Application Priority Data

Nov. 25, 1975 [FR] France ................................ 75 35932

[51] Int. Cl.$^2$ .............................................. C02B 5/06
[52] U.S. Cl. ..................................... 210/58; 252/180
[58] Field of Search .................... 210/58; 252/180, 181

[56] References Cited

U.S. PATENT DOCUMENTS

| | | | |
|---|---|---|---|
| 3,462,488 | 8/1969 | McBee et al. | 210/58 |
| 4,020,091 | 4/1977 | Budnick | 210/48 |

Primary Examiner—Thomas G. Wyse

Attorney, Agent, or Firm—Brooks, Haidt, Haffner & Delahunty

[57] ABSTRACT

Compositions for inhibiting the deposition of scale from aqueous solutions onto surfaces in contact with the solutions, such compositions comprising at least one fluorocarbon which will deposit on such surface, exemplary fluorocarbons being at least one of the following:

$$C_nF_{2n+1}-C_2H_4-N-(C_2H_4OH)_2$$
$$C_nF_{2n+1}-C_2H_4-SO_2-NH-(CH_2)_3N(CH_3)_2$$

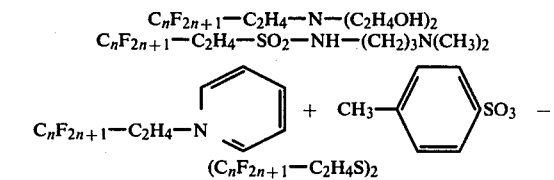

where n is an integer from 2 to 20, the compositions optionally containing hydroxyethylenediphosphonic acid, together with methods for treating surfaces with such fluorocarbons.

32 Claims, 1 Drawing Figure

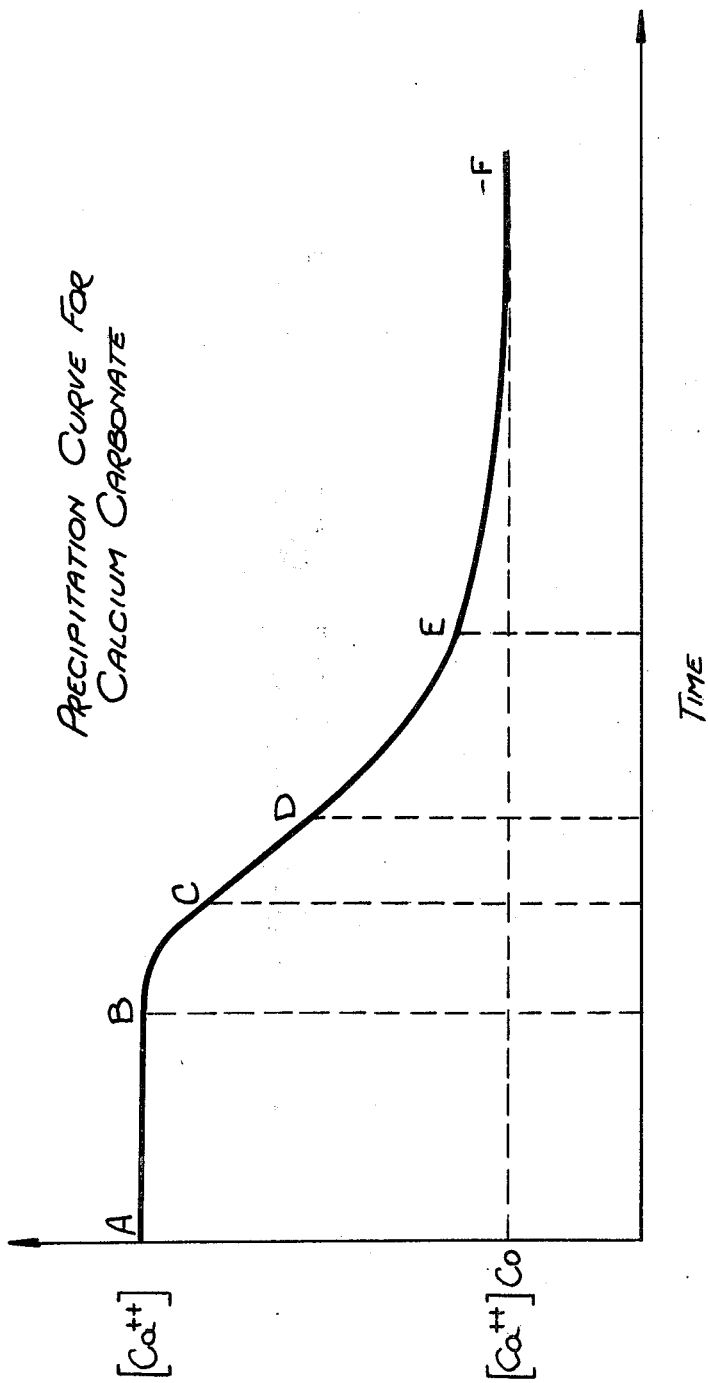

SCALE-INHIBITING COMPOSITIONS FOR AQUEOUS SOLUTIONS

BACKGROUND OF THE INVENTION

The present invention relates to compositions for inhibiting the deposit of scale from aqueous solutions, and more particularly, the invention relates to scale-inhibiting compositions and the like containing fluorocarbon compounds and which can also contain conventional boiler compounds, such as organophosphates, together with methods for preventing the deposition of scale from aqueous solutions.

Salt deposits, and particularly calcium carbonate deposits, can turn out to be very troublesome, particularly in the following areas:
Desalination of seawater by distillation,
Commercial refrigeration, and
Distribution and usage of domestic water.

There is accordingly a commercial need to provide materials which inhibit scale deposits.

A number of scale-inhibiting, or boiler, compounds have been proposed. Among these are polyphosphates, organophosphates, and polyelectrolytes. The polyphosphates have a drawback in that they are liable to hydrolyze in aqueous solutions, so that their effectiveness is greatly diminished, and moreover they are relatively toxic. The organophosphates and the polyelectrolytes often have little or no efficacy.

The anti-scaling activity of an inhibiting compound involves either a diminution of the crystal growth rate, inhibition of the homogeneous germination mechanisms (that is, the appearanace of crystals in the liquid phase), or the inhibition of heterogeneous germination mechanisms (that is, the appearance of crystals on surfaces).

THE INVENTION

The present invention provides compositions and methods for the inhibition of scale formation which avoid the disadvantages of the prior art. The present invention is based upon a study of the type of activity exhibited by fluorocarbons, as well as the activity of conventional boiler compounds, in order to provide scale-inhibiting compounds with excellent performance associated with at least two of the above-mentioned types of scale-inhibiting mechanisms. It has been found that the fluorocarbon derivatives can affix themselves to a substrate and provide antiscaling properties, with activity at the heterogeneous germination level, and that they will inhibit scale deposits on the surfaces of substrates studied.

Briefly, the present invention rests on the discovery of the activity of fluorocarbons which will deposit on or otherwise affix themselves to the surfaces to be protected. As taught herein, certain fluorocarbon compounds are particularly efficaceous in affixing themselves to surfaces. The present invention also provides methods for treating aqueous solutions and surfaces in contact therewith to prevent scale formation on such surfaces.

The invention is further illustrated by reference to the accompanying Figure which shows water hardness as a function of time.

In one embodiment of the present invention, the compositions for inhibiting the formation of scale on a surface are prepared with at least one fluorocarbon derivative which affixes itself to the surface. The testing of the ability of the fluorocarbon to affix itself to the surface of a substrate can, for example, be carried out in the following manner:

(1) Small specimens or plaques of the substrate under consideration are prepared and their surface area, S, is determined.

(2) The surfaceof the substrate under test is brought to a condition which will permit the surface to accept good coverage by the fluorocarbon derivatives. For example, in the case of the metallic surfaces, they can be buffed or polished to eliminate the oxide layer, washed with water, followed by acetone and then by trichloroethylene to completely degrease the surface under treatment. In the case of other substrates, such as glass, a water wash followed by a degreasing with solvents is generally sufficient.

(3) The surface so prepared is then rubbed with a swab containing a one-percent solution of the product to be tested in an appropriate solvent. For example, lower alkyl alcohols such as methanol and the like or lower halogenated hydrocarbons such as trichlorotrifluoroethane and the like, optionally mixed with a lower alkyl ketone such as acetone and the like, can be used.

(4) The surface is then dried, desirably at ambient temperature.

(5) The hydrophobic character of the surfaces so obtained is then evaluated. It will be understood that the fluorocarbon derivatives are hydrophobic and that this parameter well represents their ability to affix themselves to the surface under treatment. To test the effect, a pipette is used to apply 20 cm$^3$ of water dropwise from a height of 20 cm onto the center of the treated plaque. The thus-moistened specimen is then examined. It is considered that the fluorocarbon derivative is sufficiently affixed to the surface when no trace of water is found on the test slab. It has been found that the following groups of fluorocarbon products are particularly useful in the practice of the present invention:

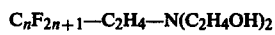

These materials are particularly useful for PVC (polyvinyl chloride) and stainless steel surfaces,

These are particularly useful for treatment of PVC surfaces.

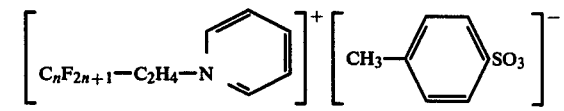

These are particularly useful for glass surfaces.
$(C_nF_{2n+1}C_2H_4S)_2$

These are particularly useful for surfaces of copper and brass.

In all of the foregoing formulas, n is an integer from about 2 to about 20.

In certain embodiments of the present invention, a method is provided whereby the surface can be treated directly with the fluorocarbon prior to contact of the surface with the scale-forming aqueous solution. This embodiment was briefly shown above wherein a cotton dauber was used to swab the fluorocarbon onto a specimen of the surface after any initial buffing or other mechanical treatment, washing, and degreasing to provide a clean surface. In this embodiment of the method, a solution which contains a sufficient quantity of the fluorocarbon to fix itself to the surface is used. In certain desirable embodiments, a solution of from about 0.1 to about 2 percent in a suitable organic solvent is utilized. Good results have been obtained with one percent solutions.

The fluorocarbon compounds used as scale-inhibitors according to this invention can be added to the water to be treated at a concentration of from about 5 to about 20 ppm (parts per million), and in certain preferred embodiments about 15 ppm have been found to give good results. It is equally possible to carry out the impregnation of the surfaces of tubes or of machinery to be protected, with a solution containing from about 1 to about 20 g/liter of the fluorocarbon composition.

All parts, percentages, proportions, and ratios herein are by weight unless otherwise indicated.

It is also possible to combine these two treatments, that is, initially to effect a saturation of the surface with the fluorocarbon and thereafter to utilize water containing the scale-inhibiting composition of the present invention. In the latter event, the concentration of the scale-inhibiting materials in the water to be used can be reduced to the proportions readily established by one skilled in the art. If required, the scale-inhibiting compositions of the present invention can be added to washing powders, detergents, or the like.

It has also been found in another embodiment according to the present invention that certain conventional boiler compounds, such as the organosphosphates act at the homogeneous germination level and it has also been found useful to utilize such conventional materials with the fluorocarbon derivatives defined above, which act at the heterogeneous germination level.

In this further embodiment, the present invention provides scale-inhibiting compositions comprising at least one fluorocarbon derivative capable of fixing itself to a surface and at least one other compound acting at the homogeneous germination level. In a preferred embodiment of the present invention, these compounds acting at the homogeneous germination stage belong to the family of organophosphates. Among these can be mentioned lower hydroxyalkylene diphosphonic acids, and it has been found that hydroxyethylene diphosphonic acid, hereinafter called "HA", is particularly preferred.

A particularly effective anti-scaling composition is prepared by associating a fluorocarbon derivative having the formula:

$$C_nF_{2n+1}-C_2H_4-SO_2-NH-(CH_2)_3-N(CH_3)_2$$

with HA. The anti-scaling effect obtained with the foregoing combination of fluorocarbon derivative and acid act at the homogeneous germination level and effect a synergism, which is frequently greatly superior to the effect of the individual components.

As in the first method for practicing the invention disclosed above, the scale-inhibiting compositions resulting from the association of a fluorocarbon derivative and a compound acting at the homogeneous germination level can be added to the water to be used. In such case, the fluorocarbon compound is desirably present at a concentration of from about 5 to about 10 ppm, and in certain preferred embodiments, at a concentration of about 8 ppm. The other constituent is desirably used at a concentration of from about 4 to about 10 ppm, and in certain preferred embodiments it is used at a concentration on the order of 10 ppm.

It is equally possible to carry out a preliminary treating or coating of the surfaces on which the deposit of scale is to be inhibited. The scale-inhibiting compositions can also be added to soap powders, detergents, and the like.

The following examples are given to illustrate embodiments of the invention as it is presently preferred to practice it. It will be understood that these examples are illustrative, and the invention is not to be considered as restricted thereto except as indicated in the appended claims.

EXAMPLES I - VII

In the following examples, the anti-scaling effect of the compositions under test is evaluated by determining the germination time. In order to do this, a curve is prepared showing the concentration of calcium ions, $Ca^{++}$, on the ordinate and the time on the abscissa. The curve obtained has the general form of the curve shown in the accompanying drawing.

Germination time, $T_g$, is shown as the portion AB of the curve, and the concentration of calcium carbonate is given in hydrotimetric degrees, °HT. (A hydrotimeter is an apparatus for determining water hardness by means of a solution containing a known quantity of soap.)

As used herein, one °HT is equivalent to 10 mg/liter $CaCO_3$, which is 0.2 milliequivalents or 4 mg/liter of calcium ion, $Ca^{++}$.

The results of these tests are presented in Table 1 as follows:

TABLE 1

| Example | Scale-inhibiting compounds | Concentration, ppm | Starting Hardness °HT | Starting Hardness t,°C | $T_g$, min | Base level °HT |
|---|---|---|---|---|---|---|
| Blank | — | — | 50 | 30 | 2 | 12 |
| I | HA | 15 | 50 | 30 | 8 | 45 |
| II | $C_8F_{17}C_2H_4N(C_2H_4OH)_2$ | 15 | 50 | 30 | 18 | 18 |
| III | $C_8F_{17}C_2H_4N(C_2H_4OH)_2$ + AH | 8<br>8 | 50 | 30 | 30 | 47 |
| IV | $C_6F_{13}C_2H_4SO_2NH(CH_2)_3-N(CH_3)_2$ | 15 | 50 | 30 | 3 | 32 |
| V | $C_6F_{13}C_2H_4SO_2NH(CH_2)_3-N(CH_3)_2$ + HA | 8<br>8 | 50 | 30 | 240 | 50 |
| VI | $C_4H_9C_2H_4N(C_2H_4OH)_2$ | 15 | 50 | 30 | 18 | 16 |

TABLE 1-continued

| Example | Scale-inhibiting compounds | Concentration, ppm | Starting Hardness °HT | t,°C | $T_g$, min | Base level °HT |
|---|---|---|---|---|---|---|
| VII | $C_4H_9C_2H_4N(C_2H_4OH)_2$ + HA | 8 8 | 50 | 30 | 15 | 41 |

EXAMPLE VIII

A brass cell is treated with a solution containing one gram/liter of a fluorocarbon derivative having the formula $(C_8F_{17}C_2H_4S)_2$ in acetone for about 24 hours.

A solution containing 8 ppm of HA having an initial 50 °HT of calcium carbonate does not precipitate after 150 minutes.

What is claimed is:

1. A process for the inhibition of scale formation on surfaces exposed to aqueous solutions which process comprises contacting the surfaces with a solution of at least one fluorocarbon derivative capable of affixing itself to the surfaces in a solvent, wherein the fluorocarbon is $C_nF_{2n+1}—C_2H_4—N—(C_2H_4OH)_2$, and n is an integer from 2 to 20.

2. A process according to claim 1 wherein the surface is contacted with the fluorocarbon prior to contact with the aqueous solution.

3. A process according to claim 2 wherein the fluorocarbon solution contains from about 0.1 percent to about 2 percent of the fluorocarbon.

4. A process according to claim 1 wherein the fluorocarbon solution is added to the aqueous solution prior to contact of the solution and the surface.

5. A process according to claim 4 wherein the aqueous solution contains from about 5 to about 20 ppm of fluorocarbon.

6. A process according to claim 4 wherein the aqueous solution additionally contains from about 4 to about 10 ppm of organophoshoric acid.

7. A process according to claim 1 wherein the surface is contacted with a fluorocarbon solution prior to exposure to the aqueous solution, and the fluorocarbon is also added to the aqueous solution prior to contact thereof with the surfaces.

8. A process according to claim 1 wherein the surface is additionally contacted with an organophosphoric acid.

9. A process for the inhibition of scale formation on surfaces exposed to aqueous solutions which process comprises contacting the surfaces with a solution of at least one fluorocarbon derivative capable of affixing itself to the surfaces in a solvent, wherein the fluorocarbon is $C_nF_{2n+1}—C_2H_4—SO_2—NH(CH_2)_3N(CH_3)_2$, and n is an integer from 2 to 20.

10. A process according to claim 9 wherein the surface is contacted with the fluorocarbon prior to contact with the aqueous solution.

11. A process according to claim 10 wherein the fluorocarbon solution contains from about 0.1 percent to about 2 percent of the fluorocarbon.

12. A process according to claim 9 wherein the fluorocarbon solution is added to the aqueous solution prior to contact of the solution and the surface.

13. A process according to claim 12 wherein the aqueous solution contains from about 5 to about 20 ppm of fluorocarbon.

14. A process according to claim 12 wherein the aqueous solution additionally contains from about 4 to about 10 ppm of organophosphoric acid.

15. A process according to claim 9 wherein the surface is contacted with a fluorocarbon solution prior to exposure to the aqueous solution, and the fluorocarbon is also added to the aqueous solution prior to contact thereof with the surfaces.

16. A process according to claim 9 wherein the surface is additionally contacted with an organophoshoric acid.

17. A process for the inhibition of scale formation on surfaces exposed to aqueous solutions which process comprises contacting the surfaces with a solution of at least one fluorocarbon derivative capable of affixing itself to the surfaces in a solvent, wherein the fluorocarbon is

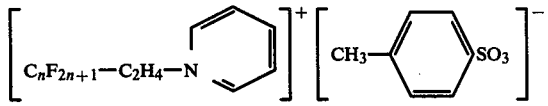

and n is an integer from 2 to 20.

18. A process according to claim 17 wherein the surface is contacted with the fluorocarbon prior to contact with the aqueous solution.

19. A process according to claim 18 wherein the fluorocarbon solution contains from about 0.1 percent to about 2 percent of the fluorocarbon.

20. A process according to claim 17 wherein the fluorocarbon solution is added to the aqueous solution prior to contact of the solution and the surface.

21. A process according to claim 20 wherein the aqueous solution contains from about 5 to about 20 ppm of fluorocarbon.

22. A process according to claim 20 wherein the aqueous solution additionally contains from about 4 to about 10 ppm organophosphoric acid.

23. A process according to claim 17 wherein the surface is contacted with a fluorocarbon solution prior to exposure to the aqueous solution, and the fluorocarbon is also added to the aqueous solution prior to contact thereof with the surfaces.

24. A process according to claim 17 wherein the surface is additionally contacted with an organophosphoric acid.

25. A process for the inhibition of scale formation on surfaces exposed to aqueous solutions which process comprises contacting the surfaces with a solution of at least one fluorocarbon derivative capable of affixing itself to the surfaces in a solvent, wherein the fluorocarbon is $(C_nF_{2n+1}—C_2H_4S)_2$, and n is an integer from 2 to 20.

26. A process according to claim 25 wherein the surface is contacted with the fluorocarbon prior to contact with the aqueous solution.

27. A process according to claim 26 wherein the fluorocarbon solution contains from about 0.1 percent to about 2 percent of the fluorocarbon.

28. A process according to claim 25 wherein the fluorocarbon solution is added to the aqueous solution prior to contact of the solution and the surface.

29. A process according to claim 28 wherein the aqueous solution contains from about 5 to about 20 ppm of fluorocarbon.

30. A process according to claim 28 wherein the aqueous solution additionally contains from about 4 to about 10 ppm of organophoshoric acid.

31. A process according to claim 25 wherein the surface is contacted with a fluorocarbon solution prior to exposure to the aqueous solution, and the fluorocarbon is also added to the aqueous solution prior to contact thereof with the surfaces.

32. A process according to claim 25 wherein the surface is additionally contacted with an organophosphoric acid.

* * * * *